United States Patent [19]

Ferrieu

[11] 4,225,963
[45] Sep. 30, 1980

[54] ARRANGEMENT FOR PROCESSING A DELTA MODULATION SIGNAL, IN PARTICULAR FOR DECODING THESE SIGNALS

[75] Inventor: Gilbert M. M. Ferrieu, Bievres, France

[73] Assignee: Telecommunications Radioelectriques et Telephoniques T.R.T., Paris, France

[21] Appl. No.: 892,850

[22] Filed: Apr. 3, 1978

[30] Foreign Application Priority Data

Apr. 4, 1977 [FR] France ............................. 77 10066

[51] Int. Cl.$^2$ ........................................... H03K 13/22
[52] U.S. Cl. .................................. 375/28; 332/11 D
[58] Field of Search ............... 325/38 B; 332/11 D; 364/577; 340/347 DD

[56] References Cited
U.S. PATENT DOCUMENTS

| | | | |
|---|---|---|---|
| 3,707,712 | 12/1972 | Deschenes et al. | 340/347 DD |
| 3,736,508 | 5/1973 | Sparrendahl | 325/38 B |
| 4,057,797 | 11/1977 | Jorgensen | 340/347 DD |

Primary Examiner—Benedict V. Safourek
Attorney, Agent, or Firm—Thomas A. Briody; William J. Streeter; Edward W. Goodman

[57] ABSTRACT

A device for processing a signal coded by means of delta modulation with a sampling rate F, comprises an analyzer for the delta modulation signal for successively forming data each of which characterizes the number of binary elements of two successive trains formed by different binary elements, each train comprising a binary element or a series of identical binary elements, a store in which said data are entered, and, finally, means for forming from the data entered into the store a sequence of binary elements composed of $\lambda$ times the two above-mentioned trains with a frequency of the binary elements equal to $2\lambda F$, $\lambda$ being an integer exceeding one. The device supplies a digital signal, which, after decoding, constitutes an excellent approximation of the analog signal which had been coded.

6 Claims, 12 Drawing Figures

4,225,963

ARRANGEMENT FOR PROCESSING A DELTA MODULATION SIGNAL, IN PARTICULAR FOR DECODING THESE SIGNALS

BACKGROUND OF THE INVENTION

The invention relates to a processing arrangement particularly for decoding a digital signal consisting of binary elements which are produced at a frequency F and result from the coding of an analog signal by means of delta modulation.

It is known that in a transmission system using delta modulation, the transmitter furnishes a sequence of binary elements whose values are obtained from comparisons, effected at sampling instants of frequency F, between the value of the analog signal to be transmitted and the value of the signal furnished by a local decoder, comprising an integrator circuit, to which a signal, derived from the emitter digital signal, is applied.

In the receiver a sequence of binary elements which is identical to that furnished by the transmitter is formed on the basis of the received signals, these binary elements being produced using the same sampling frequency F. The resulting digital signal is used in a decoder, identical to that of the transmitter, for controlling the signal applied to an integrating circuit. This integrating circuit supplies a signal which varies with a positive or a negative step at each sampling period and which is an approximated reconstruction of the initial analog signal. In the simplest systems, the size of this quantisation step is constant. In more elaborate systems, the transmitter and the receiver are provided with corresponding compression and expansion devices which automatically adapt the size of the step to the dynamics of the analog signal so that the sampling frequency F can be reduced. But in all cases the reconstructed signal furnished by the integrating circuit comprises parasitic components of the frequency F which can have a relatively important amplitude and which must be eliminated by means of a low-pass filter.

SUMMARY OF THE INVENTION

The present invention furnishes an arrangement which, without changing the characteristics of the transmission system (sampling frequency, quantisation step control, enables the obtaining of a signal at the output of the integrating circuit of the receiver which signal is a better approximation of the initial analog signal and in which especially the amplitude of the parasitic components defined above is markedly reduced, so that filtering the signal at the output of the integrating circuit is facilitated.

The invention is based on the recognition to obtain, at the output of the integrating circuit of the receiver by means of a suitable processing of the delta modulation signal, a signal resulting from an interpolation between the centers of the successive identical sequences of steps of the signal reconstructed in a conventional decoder.

This result is achieved by means of a processing arrangement comprising, in accordance with the invention:

an analyzer for the delta modulation signal for successively forming data, characterizing each of the plurality of binary elements of two successive trains, formed from different binary elements and each comprising a binary element or a series of several identical binary elements, a store in which said data are successively entered, means for forming, from each data entered into the store, a sequence of binary elements, consisting of λ times the two corresponding binary element trains having a binary element frequency equal to 2 λF, λ being an integer exceeding 1, the end of each sequence controlling in the store the erasing of information after said sequence and the reading of the following data has started.

The processing arrangement according to the invention may be incorporated in the receiver of a transmission system which utilizes delta modulation, the digital signal furnished by this arrangement being used as a decoding signal in the receiver.

The processing arrangement according to the invention may alternatively be incorporated in a converter for converting a delta modulation signal into a pulse code modulated signal. In a converter comprising an up- or down counter as a function of the value of the binary elements of a digital signal and means for reading the content of said counter at the PCM sampling frequency, the digital signal furnished by the processing arrangement according to the invention is utilized as the signal controlling the direction in which said counter counts.

DESCRIPTION OF THE DRAWINGS

The invention will be further described with reference to the accompanying drawings in which.

DESCRIPTION OF THE PREFERRED EMBODIMENT

Figure 1:
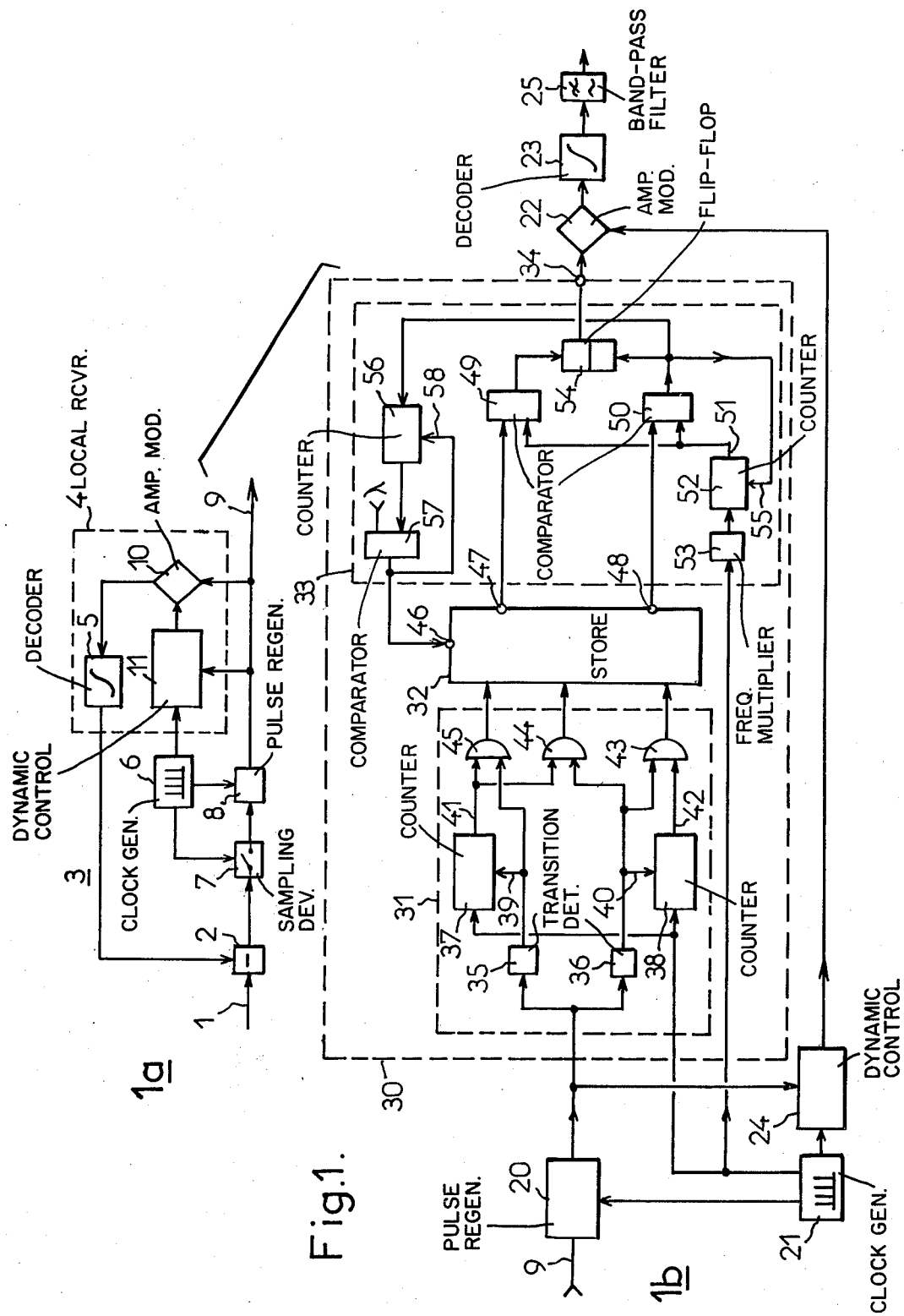
FIG. 1 shows in the portions 1a and 1b the transmitter and the receiver of a delta modulation transmission system and a diagram of the arrangement according to the invention incorporated in the receiver.

FIG. 1 represents a transmission system for signals coded by means of delta modulation, the receiver of which incorporates the processing arrangement according to the invention for decoding the received delta modulation signal. For a better understanding of the object of the arrangement according to the invention, the structure and the operation of a conventional delta modulation transmission system will be briefly explained.

In the transmitter shown in FIG. 1a, the analog signal to be transmitted, present at the input 1, is applied to a subtractor circuit 2, which also receives a comparison signal by means of a comparator circuit 3 which is provided with a local receiver 4 comprising a decoder circuit 5 constituted by an integrating circuit. Depending on the polarity of the output voltage of subtractor circuit 2, pulses, having the frequency F, produced in the clockpulse generator 6, appear or do not appear at the output of the sampling device 7. The output of this sampling device 7 is connected to a pulse regenerator 8 which may, for example, be constituted by a flipflop which may change state at the instants it receives impulses from generator 6. At the output of flipflop 8, a sequence of binary elements having the frequency F is obtained which constitute the delta modulation signal transmitted via line 9 to the remote receiver. In the local receiver 4 this digital signal is applied to an amplitude modulator 10 which is energized, for example, for producing a current having a constant strength during the duration $T=(1/F)$ of each binary element at the input of integrating circuit 5 and whose direction is changed in accordance with the value of this binary element. In this manner a comparison signal is obtained at the output of the integrating circuit 5 in the form of a voltage which changes linearly during the duration of each binary element with a positive slope or a negative slope depending on the value of this binary element.

Figure 2:
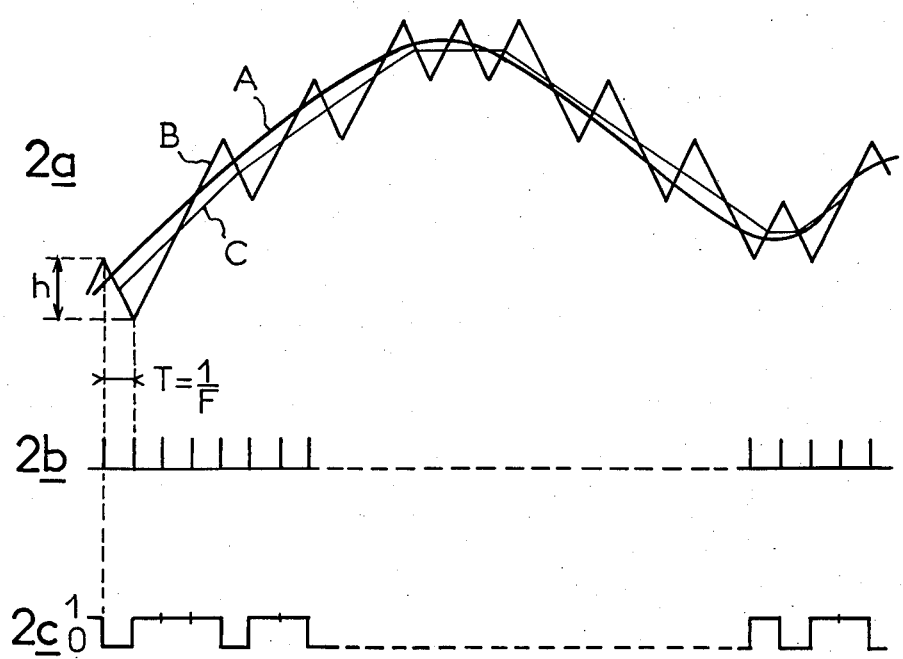
FIG. 2 illustrates by means of diagrams the decoded signal obtained in a conventional receiver and in a receiver comprising the arrangement according to the invention.

The time diagrams of FIG. 2 illustrate the operation of the transmitter described hereafter. In diagram 2a, curve A represents the analog signal to be coded, while curve B represents the comparison signals supplied by the integrating circuit 5. Diagram 2b represents the clock pulse train of the generator 6, spaced by the duration T. Diagram 2c represents the series of transmitted binary elements such as they are supplied by flipflop 8. In accordance with these diagrams a binary element having the value "0" or "1" is received in digital signal 2c at each instant of clock pulse of signal 2b, depending on whether the comparison signal B is higher or lower than the analog signal A. Consequently, during the period T of the binary element in accordance with each sampling pulse, the comparison signal B increases or decreases by a quantizing step h depending on whether this binary element has the value "1" or "0".

The value of this quantizing step is fixed in the most simple transmission systems or variable in systems in which the transmitter and the receiver comprise corresponding devices for compressing and expanding the dynamics. Such devices are, for example, disclosed in French Patent Application No. 2,198,686. In the transmitter of FIG. 1a compression is effected by means of dynamic control device 11 in which an analysis of the sequence of transmitted binary element is effected—in accordance with criteria described in the above-mentioned application—from which analysis a dynamic control signal is derived which is applied to the amplitude modulator 10 for controlling the strength of the current supplied to the integrating circuit, so for controlling quantizing step h. It should be noted that, in general, especially for the transmission of speech signals, the dynamic control device is implemented for obtaining relatively slow variations of the quantizing step.

The receiver shown in FIG. 1b, intended for use in association with the transmitter 1a, comprises a regenerator 20 which receives the signal transmitted over line 9 and which, under the control of the clockpulse generator 21, which is synchronized with generator 6 of the transmitter, supplies a digital signal consisting of a sequence of binary elements which are identical to those produced in the transmitter at the output of flipflop 8. In a conventional receiver this digital signal is decoded, in the same manner as in the local receiver 4 of the transmitter, for producing a signal which is identical to the comparison signal obtained at the output of integrating circuit 5. Thus, in a conventional receiver, the digital modulation signal, obtained at the output of the generator 20, is applied to the cascade arrangement of the amplitude modulator 22 and the integrating circuit 23, which are each identical to and play the same part as the corresponding circuits 10 and 5 in the transmitter. If the transmitter comprises a dynamic control device 11, the receiver is provided with a corresponding dynamic control device 24 which controls, in the same manner by means of amplitude modulator 22, the quantizing step in the output signal of integrating circuit 23. Finally, curve B in FIG. 2a represents the reconstructed signal supplied by integrating circuit 23 in a conventional receiver; this is an approximation of the analog signal represented by curve A. This signal, which is reconstructed stepwise shows an angular form and contains unwanted components which may have a considerable amplitude at the sampling frequency F. To eliminate these components the reconstructed signal is applied to a bandpass filter 25 which enables the supply of a smoothed signal which constitutes a better approximation of the initial analog signal. It is obvious that it is possible to achieve a better approximation of the stepwise reconstructed signal by increasing the sampling frequency F. But this has the drawback that the operating frequency of the circuits in the transmitter and the receiver and the bandwidth of the transmitted signal must be increased.

By means of the subject invention, it is possible to obtain in the receiver a reconstructed signal which is a much better approximation of the initial analog signal without the necessity of increasing the sampling frequency F and the necessity of changing the control means for the quantizing step in the case the transmission system comprises such a control.

The concept of the invention, as illustrated in FIG. 2a, is the construction, on the basis of the digital modulation signal in the receiver, of a signal represented by the curve C, which ultimately results in a linear interpolation between the values of the signal reconstructed in a conventional receiver (curve B), taken at the center of the sequence of identical binary elements. FIG. 2a clearly shows that the interpolated signal of curve C constitutes an excellent approximation of the analog signal represented by curve A.

This concept is put into practice in the receiver of FIG. 1b, by a processing device 30 of the invention which receives the delta modulation signal and which derives therefrom a new digital signal which is applied to the series arrangement of the amplitude modulator 22 and integrated circuit 23.

This processing device 30 comprises three sections:

an analyser 31 for the delta modulation signal which successively forms data, each characterizing the plurality of binary elements of two consecutive trains, formed from different binary elements and each comprising a binary element or a sequence of several identical binary elements, a store 32 in which said data are entered consecutively, a device 33 for forming, from the data read from the store 32, a sequence of binary elements constituted by $\lambda$ times the two corresponding trains of binary elements with a binary element frequency equal to $2\lambda F$, $\lambda$ being an integer exceeding 1, the end of each formed sequence controlling in the store 32 the erasure of data used to form said sequence and the reading of the following data. The series of these sequences is obtained at the output 34 of the processing device 30 and constitutes the digital signal which is applied to the amplitude modulator 22.

Figure 3:
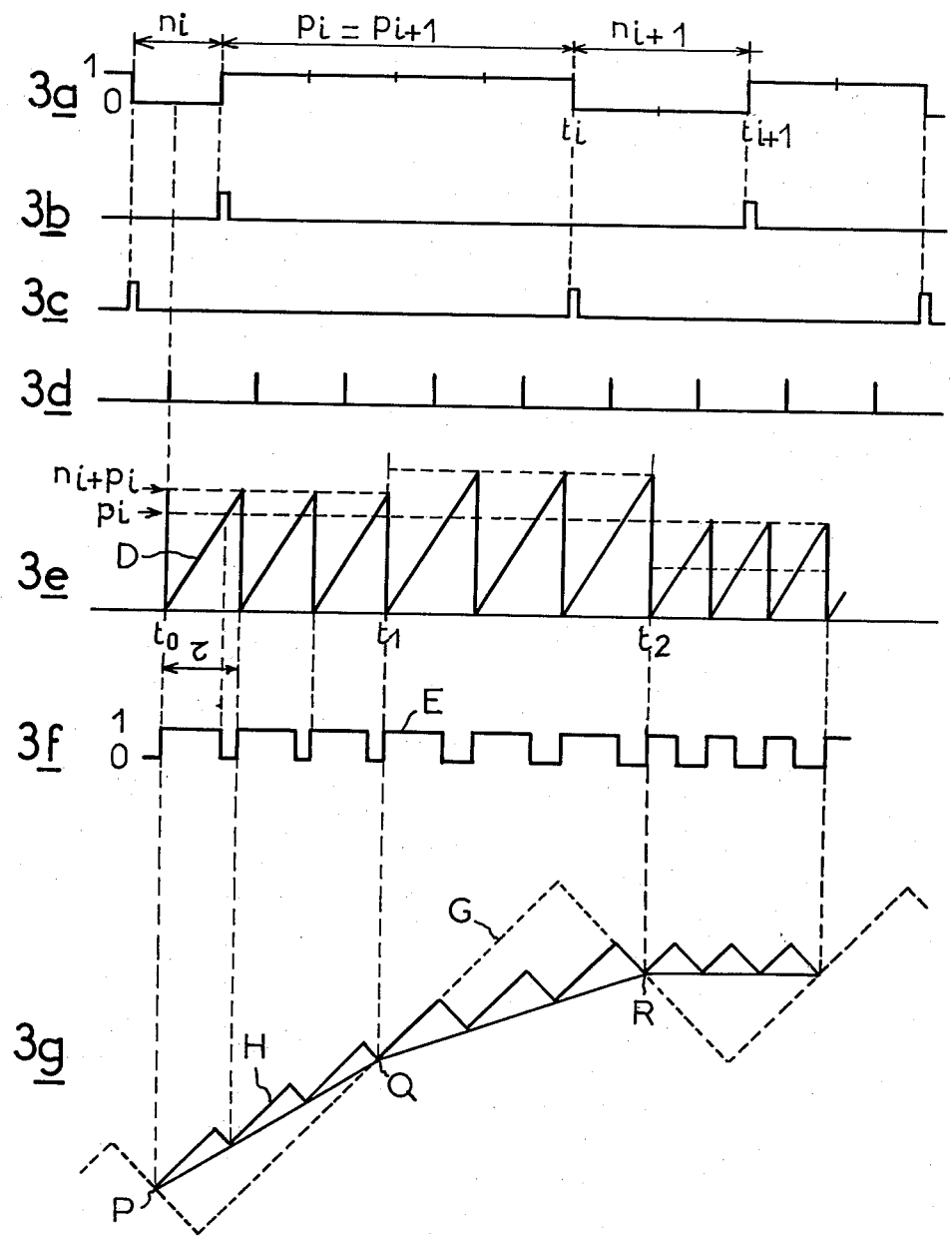
FIG. 3 illustrates by means of diagrams the operating mode of the arrangement according to the invention, Diagram 3a is the delta modulation signal to be decoded, diagrams 3b and 3e represent internal signals. Diagram 3f represents the digital signal furnished by the arrangement according to the invention. Diagram 3g represents the decoded signal obtained with the digital signal of diagram 3f.

In the embodiment shown, the analyser 31 comprises two circuits 35, 36 which detect the positive transitions (from the value "0" to the value "1") and the negative transitions (from "1" to "0") of the delta modulation signal supplied by regenerator 20. In FIG. 3, diagram 3a shows, by way of example, a limited sequence of binary elements of the duration $T=(1/F)$, which constitute this digital signal. Diagrams 3b and 3c represent pulses supplied by the circuits 35 and 36, respectively, the rising edge of each of these pulses coinciding with the respective positive or negative transition of the signal represented in 3a.

The counters 37 and 38 count the pulses of the frequency F supplied by the clock pulse generator 21 and which are formed, for example, in the middle of the binary elements which constitute the delta modulation signal represented in 3a. These pulses are shown in diagram 3d. The respective pulses supplied by the transition detection circuits 35, 36 are applied to the resetting terminals 39, 40 of the counters 37, 38, respectively, this resetting to zero being effected on the trailing edges of these pulses. The numbers counted by the counters 37, 38 appear continuously at their outputs 41, 42 and are entered in the store 32 by means of the gates 43, 44, 45 during the duration of the pulses supplied by the transition detection circuits 35, 36. By means of the gate 43 it is possible to enter the number contained in counter 38 into the store 32 at each pulse supplied by the detector 36 for the negative transitions; by means of the gate 44 it is possible to enter the number contained in the counter 37 at each pulse supplied by the detector 36 for the negative transitions; finally, by means of the gate 45 it is possible to enter the number contained in counter 37 at each pulse supplied by the detector 35 for the positive transitions.

It is easy to ascertain that a negative transition at an instant $t_i$ (see diagram 3a) determines the entering of, on the one hand, the number $n_i+P_i$, and on the other hand, the number $P_i$ into the corresponding positions of store 32, $n_i$ and $P_i$ being the number of binary elements "0" and the number of binary elements "1", respectively, of two consecutive trains formed by different binary elements which preceed the instant $t_i$, a train comprising a binary element or a sequence of several identical binary elements. For the relevant instant $t_i$, it holds that $n_i=1$, $P_i=4$ and $n_i+P_i=5$. Thus, after instant $t_i$, the information of the number of binary elements of the two above-mentioned trains are contained in store 32, this information consisting of the combination of the numbers $n_i+P_i$ and $P_i$. At the moment $t_i+1$, at which the positive transition is effected after the preceding negative pulse, the number $n_{i+1}+P_{i+1}$, where $n_{i+1}$ and $P_{i+1}$ have a significance analogue to $n_i$ and $P_i$ but which relate to the instant $t_i+1$, is entered in the store. It is obvious since $P_i=P_{i+1}$, that at the moment the number $n_{i+1}+P_{i+1}$ is entered in store 32, the number $P_i$ is reentered in a corresponding position for forming the number $P_i+1$. Thus, after the instant $t_i+1$, the combination of the numbers $n_{i+1}+P_{i+1}$ and $P_{i+1}$, which characterize the required information as regards the two trains which preceed the instant $t_{i+1}$, are present in store 32. For the relevant instant $t_{1+1}$ it will be seen that $n_{i+1}+P_{i+1}=6$ and $P_i+1=4$. At the following transition, instants combinations of numbers, formed in an analogous manner, are entered in the same manner.

The combination of numbers entered in store 32 are successively read by means of read pulses applied to terminal 46 and which are formed in the manner described hereafter. The combination of numbers read from the store appear at the outputs 47 and 48 of the store, the numbers $n_i+P_i$ appearing at 48 and the numbers $P_i$ appearing at 47. Each read pulse simultaneously effects the erasure in the store of the combination of number read at the preceding read pulses. The capacity of the store 32 depends on the configuration of the binary elements in the delta modulation signal and especially on the maximum number of successive identical binary elements. In practice this capacity may be rather low and corresponds to a storage of 5 to 10 number combinations, each consisting of 4 binary elements.

The third section 33 of the processing device 30 according to the invention processes number combinations appearing at the outputs of the store 32. This third section 33 comprises two circuits 49, 50, each checking whether the numbers supplied to the two inputs thereof are equal. One input of the circuit 49 is connected to the output 47 of the store 32 while the respective input of circuit 50 is connected to the output 48 of the store 32. The other input of both of these circuits 49 and 50 are connected to the output 51 of a pulse counter 52, at which the counted numbers appear continuously. The frequency multiplier 53 forms pulses at the frequency $2\lambda F$, which are counted in counter 52, by multiplying by $2\lambda$ the pulses of frequency F of the clock pulse generator 21, $\lambda$ being an integer exceeding 1. Circuits 49 and 50 each supply a pulse at the moment the two numbers at their respective inputs are equal. These pulses are each utilized for setting a flipflop 54 in a given state; for example, an output pulse of the circuit 49 changes the state of the output of the flipflop to "0" while an output pulse of the circuit 50 changes the state of the output of the flipflop to "1". The output pulses of the circuit 50 are simultaneously applied to a terminal 55 of the counter 52 for resetting this counter to zero. The output pulses of circuit 50 are furthermore counted in a pulse counter 56. The numbers counted in this counter appear at its output, which is connected to an input of a circuit 57, which checks whether the counted numbers are equal to the above-defined fixed number $\lambda$. If it detects equality, the circuit 57 supplies a pulse which is applied both to a terminal 58 of the counter 56 for resetting the counter 56 to zero and to the terminal 46 which controls the reading and erasing of the store 32. In this mode of operation, the output of the flipflop 54 constitutes the output 34 of the processing device 30 according to the invention.

The operation of section 33 of the device according to the invention will now be further explained by means of diagrams 3e and 3f of FIG. 3. In diagram 3e the dotted horizontal lines represent the level corresponding to numbers such as $n_i+P_i$ and $P_i$ appearing at the outputs of store 32 and which are respectively applied to one of the inputs each of the circuits 50, 49. The sawtooth curve D represents in the form of a solid line, the contents of the counter 52 applied to the other of the inputs each of the circuits 49, 50. The signal E of diagram 3f represents the state of the output of the flipflop 54. The instant taken as the starting point for the operation is the instant $t_0$, it being assumed that the numbers $n_i+P_i$ and $P_i$, which correspond to the instant $t_i$ of diagram 3a appear at this instant at the input of circuits 49, 50. To facilitate the comparison with a conventional receiver, this instant $t_0$, which considerably lags behind instant $t_i$, is placed in an arbitrarily chosen position in diagrams 3e and 3f relative to the centre of the binary element "0" which, in diagram 3a, preceeds instant $t_i$.

It is assumed that at instant $t_0$ the counter 52 is reset to zero so that curve D starts at zero and flip-flop 54 is assumed to have been adjusted to the "1" state, so that the signal E has the value "1". After instant $t_0$, the contents of the counter 52 increases (first slope of curve D) whereafter it arives at level $P_i$. At this instant the output signal E of the flipflop 54 becomes zero by means of circuit 50 and remains in this state until the contents of the counter 52 reaches the level $n_i+P_i$ which is detected by circuit 50 at instant $t_0+\tau$. At this instant the counter 52 is reset to zero, the flipflop 54 is reset to the "1" state and the counter 56, which was initially supposed to be at zero, counts a first pulse. The same procedure is repeated until the contents of the counter 56 reaches the number $\lambda$ which the circuit 57 detects at instant $t_1$. This detection causes the counter 56 to be reset to zero, the numbers $n_i+P_i$ and $P_i$ used so far to be erased from the store 32 and the appearance at the outputs 48, 47 of the store 32 of the following numbers $n_{i+1}+P_{i+1}$ and $P_{i+1}$, which are used in the same manner during the period of a new counting cycle of the counter 56, until instant $t_2$. The same process starts again after instant $t_2$.

It is easy to see that during the period $\tau$ of a counting cycle of the counter 52, for example the cycle beginning at instant $t_0$, the digital signal E supplied by the flip-flop 54 is formed by a sequence of $n_i+P_i$ of binary elements, each having a duration $1/2\lambda F$, this sequence comprising, just like the corresponding sequence relative to the instant $t_i$ in diagram 3a, a series of consecutive $P_i$ binary elements "1" and a series of consecutive binary elements "0" ($P_i=4$ and $n_i=1$ for the sequence under consideration); the only difference being that the sequence of the two series of binary elements has been changed, but this is not essential as will be apparent from the following description. In the signal E the same sequence is repeated $\lambda$ times, during the time interval from $t_0$ to $t_1$ which has a value of $$\frac{n_i + P_i}{2\lambda F} \times \lambda = \frac{n_i + P}{2F}.$$

Likewise, during the time interval from $t_1$ to $t_2$ a further sequence formed by means of the numbers $n_{i+1}+P_{i+1}$ is also repeated $\lambda$ times, which time interval from $t_1$ to $t_2$ has the value $$\frac{n_{i+1} + P_{i+1}}{2F}.$$

Diagram 3g shows the improvement obtained by means of the processing device 30 according to the invention for decoding a delta modulation signal. For comparative purposes the signal obtained at the output of the integrating circuit 23 of a receiver without the use of the device according to the invention is illustrated by means of the dotted curve G; that is to say in which the delta modulation signal of diagram 3a is applied directly to the amplitude modulator 22. This curve G is composed with a fixed quantizing step. If the device according to the invention is used, the digital signal E, shown in diagram 3f, is applied to the amplitude modulator 22. Then the signal illustrated by the solid curve H is obtained at the output of the integrating circuit 23. This signal H is formed by a sequence of sawtooth waveforms each of the same duration $\tau$, which each have a positive and a negative edge of the same value as the edges of curve G. The relation between the duration of two edges of one sawtooth is determined by the form of the signal E. Between the two points P and Q of the signal H, at the instants $t_0$ and $t_1$, curve H has $\lambda=3$ sawteeth which are identical and it is easy to verify that it is "tangential" to segment PQ. Likewise, from point Q to point R, representing the signal H at the instant $t_2$, curve H comprises three other sawteeth which are identical, the curve being "tangential" to segment QR.

In diagram 3g, the sawtooth waveforms of curve H are always above the curve formed by the segments PQ, QR, etc. and will henceforth be called curve PQR because each sawtooth begins with a positive edge. By means of slight modifications of the device according to the invention which can easily be conceived by a person skilled in the art, it is alternatively possible to obtain sawtooth waveforms which are always below or alternately above and below curve PQR. It is then sufficient to change, in digital signal E, the sequence of the series of binary elements which together form each sequence of the duration $\lambda$. In FIG. 3, $\lambda=3$ has been opted for to facilitate the construction of the diagrams, but it is obvious that one can choose without any trouble a higher value for $\lambda$, for example 10 or 20, so that the sawtooth curve H, in practice, differs only slightly from the curve constituted by the segments PQR. Diagram 3g also shows that the curve, constituted by the segments PQR limited by the curve H, if $\lambda$ is sufficiently high, is the result of a linear interpolation between the centers P, Q, R of the edges of curve G of the decoded signal which would be obtained in a conventional receiver. Consequently, the device according to the invention enables, in practice, the obtaining of the interpolated signal which is represented by curve C in FIG. 2. It is obvious that this interpolated signal constitutes a much better approximation of the analog signal represented by curve A than the signal, represented by curve B and obtained in a conventional receiver.

The decoded signal obtained by means of the processing device 30 according to the invention accurately follows the ideal interpolated signal in a transmission signal where the quantizing step is fixed. In a transmission signal provided with devices for controlling the quantizing step, a decoded signal which deviates only slightly from the ideal interpolated signal is obtained with the device according to the invention to the extent that the quantizing step does not experience considerable variations during the duration of two consecutive series of identical binary elements of the delta modulation signal. This condition is substantially no restriction for using the device according to the invention at this condition is fulfilled in the majority of delta transmission systems by means of variable quantization steps.

A further very interesting application of the invention is for transcoding a signal, coded by delta modulation, into a PCM digital signal (pulse code modulation). A known transcoder is, for example, disclosed in the article by I. A. Deschênes and N. Villeret, entitled "A continuous delta modulator and a numerical converter for an integrated Telecommunication Network" pages "7-27 to 7-32" published in the publication IEEE 1970, International Conference on Communications. In this apparatus the binary elements of the delta modulation signal are utilised to have a counter count up or down according to whether the value is "1" or "0". If the quantizing step is variable, the counter counts up or down for each binary element by a variable number which is proportional to the size of the step and which can be easily deduced from the dynamic control signal. Sampling the contents of the counter at the sampling rate, PCM numbers are obtained which are representative of the required PCM samples. In accordance with FIG. 2, the operation described above is equivalent to a sampling procedure of the signal represented by curve E so that the PCM samples obtained in this manner are affected by quantizing noise of the delta modulation.

In this respect it is advantageous to incorporate the processing device according to the invention in a transcoding system of this type. Then the digital signal supplied by the device according to the invention is used for controlling the upcounting or down-counting operation of the counter. Sampling the contents of this counter is then almost equivalent to sampling the interpolated signal illustrated by curve C of FIG. 2: in this manner the PCM samples obtained are prevented to a great extent from being affected by quantizing noise to the delta modulation.

What is claimed is:

1. A processing device for decoding a digital signal formed from binary elements which occur at the frequency F and are produced by coding an analog signal by means of delta modulation, said device comprising:
a device means for analysing digital signal for successively forming data each representing the number of binary elements of two consecutive trains of different binary elements each of which comprises a binary element or a series of several identical binary elements,
a store in which said data are successively entered,
means for forming, on the basis of said data read from the store, a sequence of binary elements, said formed sequence having $\lambda$ times the two previously recited consecutive trains of binary elements, said formed sequence having a binary element frequency equal to $2\lambda F$, wherein $\lambda$ is an integer exceeding 1, the end of each formed sequence controlling the erasure of the data in the store used to form said sequence, and the reading of the following data.

2. A processing device as claimed in claim 1, wherein the data which corresponds to the above two consecutive trains of binary elements, comprises the total number of binary elements of the two trains and the number of binary elements of one of the two trains.

3. A processing device as claimed in claim 1 or claim 2, wherein the analyser device means comprises a first detector for detecting the positive transitions and a second detector for detecting the negative transitions of the delta modulation signal, first and second counters coupled respectively to said first and second detectors which count the clock pulses at the frequency F and which are each reset to zero by said respective first and second detectors, and a first and a second gate means for entering into the store the numbers counted in the respective first and second counters just before the respective counters are reset to zero and a third gate means for entering into the store the number counted by said first counter just before the second counter is reset to zero.

4. A processing device as claimed in claim 2, wherein said forming means comprises first, second and third equality detectors each having two inputs thereto, each of said equality detectors being capable of supplying a pulse when signals on the two inputs thereof are equal, the data, which appears as two numbers at the output of the store, being applied respectively to one of the inputs each of said first and second equality detectors, a first counter means for counting the pulses of the frequency $2\lambda F$ and for applying the number of counted pulses to the other inputs of both of said first and second equality detectors, a flipflop, the pulses supplied by said first equality detector being used for adjusting the output of said flipflop to a first state, the pulses supplied by the second equality detector being used for adjusting the output of said flipflop to a second state and for resetting said first counter means to zero, a second counter means for counting the number of pulses from said second equality detector, the number counted in said second counter means being applied to one of the inputs of said third equality detector, the other input of said third equality detector receiving the number $\lambda$, the pulses supplied by said third equality detector being used for resetting said second counter means to zero and to cause the store to erase the data contained therein and to read a new set of data, the output signal of the processing device being obtained at the output of said flipflop.

5. A receiver for a transmission system using delta modulation, said receiver comprising the processing device as claimed in claim 1 or 2, and which further comprises means for using the digital signal supplied by said processing device as the decoding signal.

6. A device for converting a delta modulation signal into a digital PCM signal, said converter comprising an up-down counter having a counting direction depending on the value of the binary elements of a digital signal, and means for reading the contents of said counter at the PCM sampling frequency, the converter further comprising the processing arrangement as claimed in any of the claims 1 to 2 and means for using the digital signal supplied by said processing arrangement as the signal for controlling the up-counting or down-counting operation of said counter.

* * * * *